Patented Feb. 17, 1942

2,273,573

UNITED STATES PATENT OFFICE 2,273,573

PROCESS FOR TREATING ALCOHOL, AND CATALYST THEREFOR

Rudolph Leonard Hasche, Kingsport, Tenn., assignor to Eastman Kodak Company, Rochester, N. Y., a corporation of New Jersey No Drawing. Application June 20, 1939, Serial No. 280,126

8 Claims. (Cl. 260—603)

This invention relates to processes for treating lower aliphatic alcohols and in particular ethyl alcohol to convert the ethyl alcohol into acetaldehyde, and catalysts particularly suitable for carrying out this reaction.

This application is a continuation-in-part of my allowed application Serial No. 34,215, now Patent No. 2,173,111. As pointed out in that application, one of the products derived from alcohols, is aldehydes. Aldehydes have a number of industrial uses. For example, acetaldehyde may be converted into acetic acid, polymerized, or otherwise employed in the production of synthetic materials.

As further indicated in my allowed application, a number of processes have been suggested in the art for converting alcohols to aldehydes, particularly with reference to the treatment of ethyl alcohol for this purpose. Many of these processes are described as carried out in the presence of various metal catalysts in a finely divided condition. However, when attempting to operate such processes on an industrial scale, the finely divided catalyst materials tend to pack in the catalyst apparatus or otherwise impede the passage of the materials therethrough.

It has also been suggested to employ crushed metallic materials for catalysts. Likewise, in this instance even though the crushed materials are screened before use, a certain amount of fines are present which may blow out of the catalyzers into other parts of the apparatus or which may tend to pack in the extremities of the catalyzers, thereby causing channeling and slowing up of the flow of materials therethrough.

It has also been proposed to mold or otherwise compress finely divided catalyst materials into larger particles. However, such procedure involves added expense as well as in many instances partly destroys the porosity of the catalytic material.

Another form of catalyst which has been proposed is an inert material such as lump carborundum or pumice which has been impregnated with a copper salt and subsequently reduced to a finely divided metal. This has the disadvantage that it is subject to fouling and dusting.

I have found novel catalyst material which obviates the aforementioned difficulties. I have also found that this catalyst material is particularly useful for converting lower aliphatic alcohols such as ethyl alcohol into their aldehydes.

This invention has for one object to provide a process of dehydrogenating alcohols or materials containing a large amount of alcohols. Another object is to provide a continuous process for converting alcohols, such as ethyl alcohol, into the corresponding aldehydes. Still another object is to provide a new catalyst and a method of preparation therefor, which catalyst is particularly useful for converting lower aliphatic alcohols to their aldehydes. Still another object is to provide a metal catalyst which is substantially non-dusting and which does not easily crush or tend to clog catalyst apparatus. Still another object is to provide a novel method for preparing non-dusting copper catalyst pellets. Other objects will appear hereinafter.

In the embodiment of my process to which the instant application is directed, ethyl alcohol is treated in the presence of my novel catalyst to obtain a high yield of acetaldehyde. The alcohol may be mixed with other constituents such as, for example, a water-alcohol azeotrope and air, or other oxidizing mediums, may be included in the reaction. The aldehyde obtained by my catalytic process may be treated by distillation or other procedure as described in my allowed application Ser. No. 34,215 to separate the aldehyde from alcohol, water and other constituents in the reaction mixture. The aldehyde obtained may be oxidized to acid, polymerized or otherwise employed.

In carrying out my process as applied to lower aliphatic alcohols and in particular ethyl alcohol, substantially the same arrangement of apparatus may be employed as shown in my Patent No. 2,173,111. That is, suitable alcohol vaporizers would be provided for vaporizing the lower aliphatic alcohol to a preheater. This preheater is optional and may be employed, for example, at all times during the process, or, for example, only when the process is being started up. One or more catalyst units in parallel would be connected with the source of the alcohol vapors and suitable inlets provided for oxidizing medium, or other constituents. The catalyzers would be connected with condensers, scrubbers, distillation columns, and other units for the recovery and utilization of the aldehyde produced.

Referring now to the catalyst units, these units would preferably be filled with my novel non-dusting, water-quenched pellet type of catalyst.

This type of catalyst may be prepared by blowing (Bessemerizing) copper materials, decomposing copper salts, or by other suitable procedure for preparing a bath of molten copper material. The copper material may comprise oxides of copper, as cuprous oxide. The molten copper material is then granulated by pouring into water. The copper stream may, if desired, be broken up, as by pouring through a screen or by other procedure before reaching the water. Or, other procedure such as that employed in operating a shot tower or breaking up the copper material by means of an inert gas may be carried out to obtain the material in spherical shape which is partially hollow or porous. By proceeding as aforementioned, the copper spheres of a size, for example, between 2–5 mesh may be obtained and employed in the catalyzer units aforementioned.

As indicated in my Patent 2,173,111, I prefer to melt (Bessemerize) oxides of copper as for example an oxide composition having a content of cuprous oxide. As also indicated in my allowed application, small amounts of other constituents such as carbonates and oxides or various metals may be included. Among those mentioned are the alkali earth metals, magnesium salts and the like. When I refer to my copper catalyst, generically I may also intend to embrace copper containing various amounts of promoters and other constituents which may be present in the catalyst without detrimentally affecting its action.

After the catalyst has been charged in the catalyzers, it may conveniently be subjected to a reduction treatment with hydrogen, alcohol or other reducing agent but such procedure is not essential. Assuming that the process is to be put in operation the alcohol to be treated is pumped from the storage tank through a vaporizer and the alcohol vapors passed in contact with my novel catalyst. If it is desired to preheat the alcohol vapors preferably this would be carried out at between about 150° C. and 250° C. Also, if desired, a quantity of air or other oxidizing medium in an amount from a fraction of the alcohol vapors to an amount five or six times the quantity of the alcohol vapors may be incorporated therewith. The alcohol may be anhydrous or may contain up to 35–40% of a diluent such as water. One convenient source of alcohol to treat is the alcohol azeotrope.

For heating the catalyst in the catalyzers, hot oil or other suitable heating medium may be employed and preferably the temperature of the catalyst would be raised to between 300–325° C. In some instances the heat of reaction is sufficient to furnish all the required heat and it is not necessary to supply the hot oil. The alcohol passing through the catalyst yields a reaction product comprising principally aldehyde, gases, unconverted alcohol and water. For example, reaction temperatures from about 300–450° C. and space velocities from 500–5,000 may be employed.

The reaction products, in the instance of ethyl alcohol treatment, comprise acetaldehyde, ethyl alcohol, water and gases, pass out of the catalyzing apparatus through cooling means and/or scrubbers for causing the condensation and separating out of the condensable constituents such as alcohol, aldehyde and water. If desired, the reaction products may be cooled to below freezing (0° C.) by means of direct ammonia evaporation condensers.

The condensed mixture of alcohol and aldehyde and any water may be distilled, the aldehyde being obtained as a head product and the alcohol as a tail product. Each of these constituents may further be employed. For example, the acetaldehyde may be catalytically oxidized to acetic acid.

By proceeding in accordance with the procedure set forth herein of contacting ethyl alcohol with my novel catalyst and cooling the reaction products, it is possible to convert, for example, about one half or more of the alcohol to aldehyde in a single pass.

After the catalyst has been in use for a substantial period, if desired, the catalyst may be activated. That is, the catalyst may be treated by steps including (1) flushing, (2) oxidizing, (3) flushing and (4) reduction. It is possible to omit a certain number of the flushing steps. However, my catalyst will function satisfactorily for months without any special treatment, assuming that it is not permitted to be poisoned or unnecessarily damaged.

My catalyst is also particularly advantageous not only because it converts alcohols to aldehydes with substantial yields, but, being in the form of relatively smooth, strong pellets varying for example from about $\frac{1}{8}$ of an inch to $\frac{3}{4}$ of an inch in diameter, the catalyst does not plug or pack in the catalyzers. That is, a catalyst bed comprising several feet of catalyst may be placed in the catalyzer without materially impeding the flow therethrough of the alcohol to be processed. Furthermore, my novel water-quenched catalyst pellets are substantially non-dusting and therefore in the operation of the process metal dust is not carried into the other parts of the apparatus.

Although I prefer to employ materials essentially comprising oxides of copper, as indicated, other salts may be used and/or the oxides of copper mixed with various other oxides and salts, such as described in my Patent No. 2,173,111.

It is apparent that my invention is susceptible of some modification; hence, I do not wish to be restricted, excepting insofar as is necessitated by the prior art and the spirit of the appended claims.

What I claim and desire to be secured by Letters Patent of the United States is:

1. A process for treating lower aliphatic alcohols, which comprises contacting the alcohol at a space velocity between 500 and 5000 with a copper catalyst that has a low tendency to dust and is essentially comprised of water-quenched copper pellets, 2 to 5 mesh size, obtained from molten oxides of copper.

2. A process for producing acetaldehyde, which comprises contacting a vaporous mixture having a substantial content of ethyl alcohol at a space velocity between 500 and 5000, with a catalyst comprised substantially of dustless, water-quenched pellets of copper, maintaining the temperature of the catalyst between 250° C. and 500° C. and separating at least a part of the acetaldehyde produced.

3. A process for dehydrogenating ethanol, which comprises preheating the ethanol at a temperature between 250° C. and 500° C., contacting the heated ethanol at a space velocity between 500 and 5000 with a catalyst that has a low tendency to dust and is substantially comprised of water-quenched copper pellets, 2 to 5 mesh size, obtained from fused oxides of copper, maintaining the catalyst at a slightly higher temperature than the preheating temperature and cooling the reaction products.

4. A process of treating ethanol which comprises contacting the ethanol at a space velocity between 500 and 5000 with a catalyst essentially comprised of substantially dustless, water-quenched pellets, 2 to 5 mesh size, obtained from highly heated oxides of copper, whereby a reaction mixture of acetaldehyde, ethanol, gases and water vapor is obtained, and subjecting the reaction mixture to further treatment including condensation and distillation of the condensate to separate at least a part of the acetaldehyde.

5. A process for preparing a catalyst for use in the treatment of alcohols which comprises preparing a molten metallic bath essentially comprising copper, gradually pouring said bath in an attenuated form into an aqueous quenching medium to obtain relatively smooth, strong pellets of a size from $\frac{1}{16}$ of an inch to $\frac{3}{4}$ of an inch in diameter.

6. A process for preparing a catalyst which comprises Bessermerizing copper salts to obtain a flowable effervescing liquid and before effervescence has ceased, pouring the material in an attenuated condition into a water quenching bath to obtain substantially dustless catalyst pellets greater than $\frac{1}{16}$ of an inch, but not greater than approximately $\frac{3}{4}$ of an inch in diameter.

7. A process of producing an active metal catalyst which comprises fusing metallic materials, of which a major portion consists of oxides of copper, pouring the fused materials in an attenuated condition while in a substantially liquid condition, into a quenching bath of water to produce substantially dustless metal pellets.

8. A process for treating ethanol solutions which comprises contacting the ethanol solutions at a space velocity between 500 and 5000 with a substantially dustless dehydrogenation catalyst of relatively smooth copper pellets, 2 to 5 mesh size, at a temperature between 250° C. and 500° C., whereby a reaction mixture of acetaldehyde, ethanol, gases, and water vapor is obtained.

RUDOLPH LEONARD HASCHE.